June 11, 1957     D. H. McINTOSH     2,795,500
PROCESS OF REMOVAL OF ZINC VALUES FROM SLAG
Filed May 28, 1953     3 Sheets-Sheet 1

INVENTOR.
DONALD H. McINTOSH

BY *Elwood J. Schaffer*

ATTORNEY

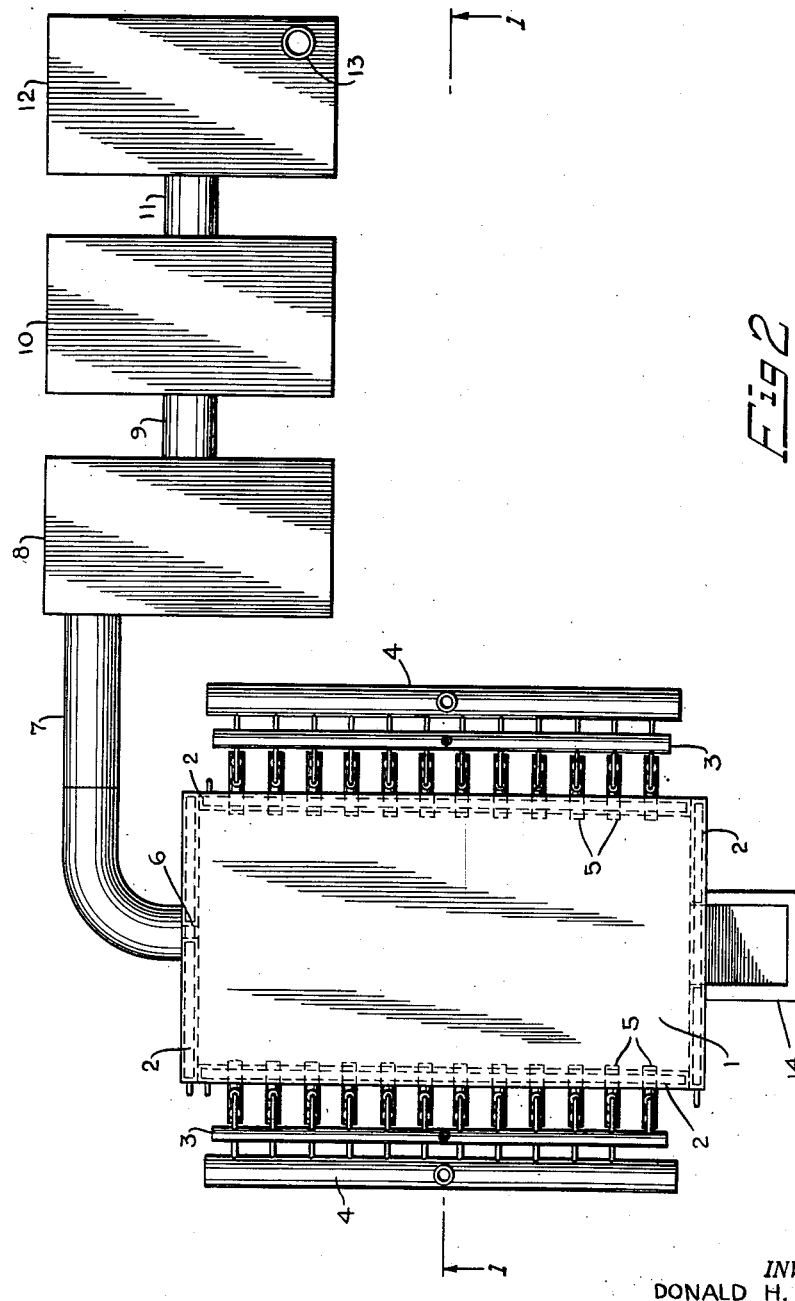

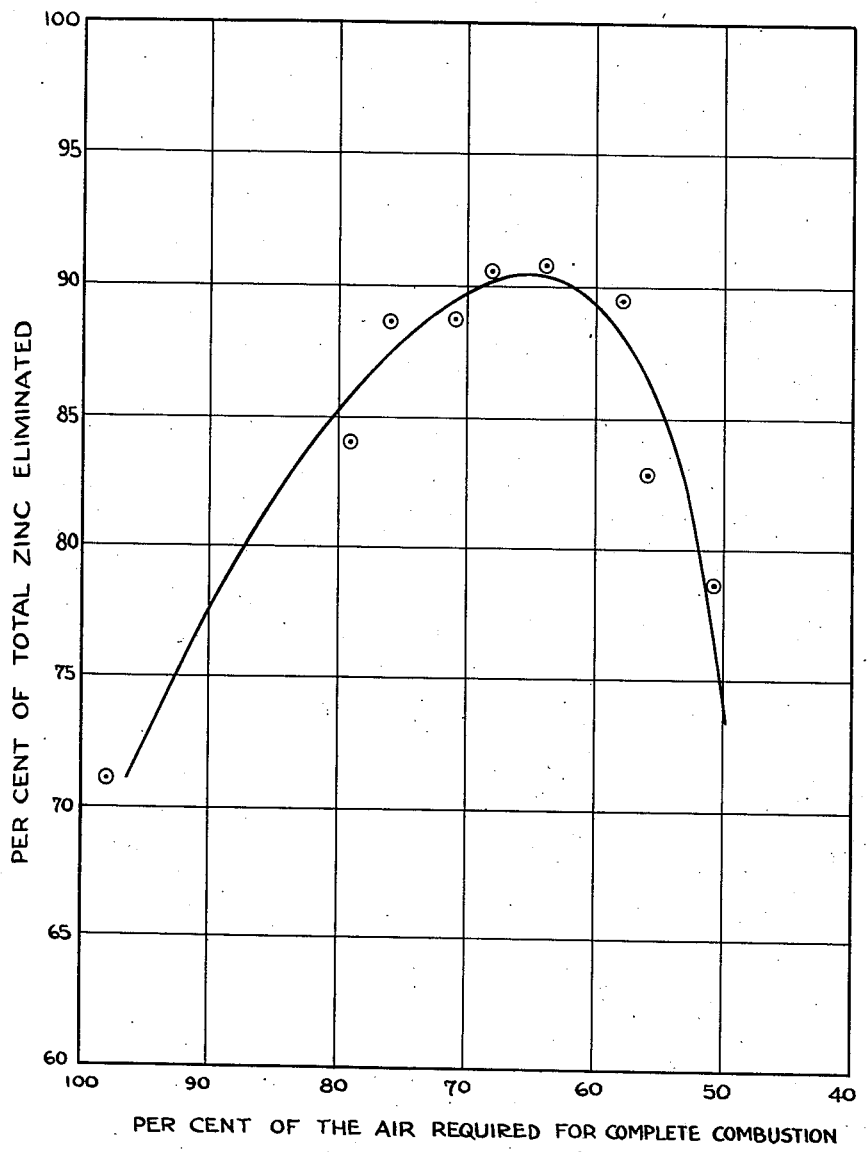

United States Patent Office 2,795,500
Patented June 11, 1957

2,795,500

PROCESS OF REMOVAL OF ZINC VALUES FROM SLAG

Donald H. McIntosh, Salt Lake City, Utah, assignor to American Smelting and Refining Company, New York, N. Y., a corporation of New Jersey Application May 28, 1953, Serial No. 358,024

3 Claims. (Cl. 75—87)

This invention relates to a process for removal of zinc values from zinc-bearing material. More particularly, it relates to the removal of such values from metallurgical slags containing same, especially lead blast furnace slags.

Broadly, the invention comprehends a process for removal of zinc values from a zinc-bearing material by establishing a molten pool of said material containing zinc in a reducible form, and injecting into the molten pool beneath its surface a combustible mixture of a liquid fuel comprising a residual type oil from the cracking of petroleum and an oxygen-containing gas in amounts to insure incomplete combustion of the fuel, the rate of addition of the mixture being sufficient to maintain the bath in a molten condition thereby reducing reducible zinc values in the slag to metallic zinc and volatilizing the thus reduced zinc from the molten material.

The invention may be practiced in connection with any zinc-bearing material in which the zinc is in a reducible form, or has been converted to a reducible form; that is to say, the zinc is in a form that may be considered to be an oxide. Thus, for example, zinc oxide, zinc silicate, zinc ferrite, or zinc aluminate ores and the like may be used. Zinc sulphate and zinc sulphide ores may also be used if they have been roasted or otherwise treated to convert the zinc to the zinc oxide form. The preferred materials in the process are zinc-bearing metallurgical slags, such as zinc-containing cooper reverberatory slags or zinc-containing lead blast furnace slags; the latter type slags being the most preferred. In addition to oxidic zinc, such slags typically contain silica, alumina, iron oxide and calcium oxide, as well as small amounts of lead oxide and other minor constituents. The slags may be acid, basic or neutral in character, although neutral or basic slags are preferred. Desirably and typically, zinc-bearing lead blast furnace slags contain by analysis the following: $SiO_2$ 19–24%; FeO 25–35%; CaO 16–23%, $Al_2O_3$ 3–5%, ZnO 8–19%, PbO 0–2%. Likewise, zinc-bearing copper reverberatory slags contain: $SiO_2$ 38–40%, FeO 41–44%, CaO 6–9%, $Al_2O_3$ 6–8%, ZnO 8–19%, PbO 0–2%.

The process is conducted at temperatures at which the zinc-bearing materials are maintained in a molten condition, at which temperatures it has been found that the oxidic zinc is reduced to metallic zinc which is then volatilized from the molten pool. Preferably, and for best results, particularly in connection with lead blast furnace slags, the temperature of the molten material is maintained in the range of about 2,200°–2,500° F. during the process.

In the course of the experimentation which resulted in the invention upon which the present process is based, it was found that fluid fuels, such as natural gas or other gaseous fuels, light fuel oil and various distillates could not be used successfully in the process. Quite unexpectedly, however, it was found that of the non-solid fuels, only liquid fuels of the residual type oil from the cracking of petroleum could be used successfully in the process. Thus, the use of fuels of this type, which do not exceed about 20–23 degrees A. P. I. (American Petroleum Institute) gravity tested in accordance with A. S. T. M. (Serial D 287–39) of the American Society of Testing Materials, are of critical importance to the success of the process.

It has been found also that the efficiency of the process increases as the A. P. I. gravity value of the residual type of fuel decreases; that is to say, as the density and viscosity of the residual type fuel increases, the efficiency of the process also increases. Good results are obtained with residual type fuels having an A. P. I. gravity of about 14–16 degrees. Excellent results are obtained with fuels having an A. P. I. gravity of about 7–12 degrees. Best results are obtained with the heaviest oils, such as those having an A. P. I. gravity of about 5–7 degrees. Residual type oil from the cracking of petroleum having an A. P. I. gravity below about 5 degrees is generally not commercially available. The latter oil, however, is highly desirable but is very difficult to transport and handle. Handling difficulties also arise, but to a more limited extent, with oils having an A. P. I. gravity of 5–7 degrees. Therefore, taking into consideration convenience of handling, residual type fuels having an A. P. I. gravity of about 7–12 degrees are preferred.

The residual type oils with which the present invention is concerned may be obtained by the thermal or catalytic cracking of crude petroleum. In accordance with the practice in the petroleum industry, the residual type oil of the invention results from the separation, usually by distillation, of the lighter constituents of the cracked petroleum. Such separation may result in the direct recovery of the present residual type of fuel. Generally, however, residual type fuels are obtained by conducting the separation until an oil having an A. P. I. gravity of about 5–7 degrees is obtained which is then blended with a light oil distillate. The amount of distillate blended may be varied to give any desired A. P. I. gravity.

It has been found further that it is necessary to the successful operation of the process that the submerged combustion of the present fuel in the molten zinciferous material be incomplete. Additionally, it has been found that it is of critical importance in obtaining desirable efficiency in the process that the fuel be burned with air in amounts of about 50 to 98% of the air required for complete combustion. Highest zinc removals are obtained with percentages of air of about 57 to 75%; the highest removal being obtained with a percentage of air of about 65%.

The submerged combustion causes the molten pool to be relatively violently agitated due to the escape of the products of combustion and the evolved vapor. In conducting experiments with the process, it was found that a black smoke in increasing amounts was evolved from the molten bath as the air was decreased below that required for complete combustion. The percentage zinc removal, however, does not follow the evolution of the black smoke. Thus, when about 65%, or less, of the air required for complete combustion was used, increasing amounts of black smoke were evolved. However, the percentage zinc removal dropped off rapidly with such decreased amounts of air and increased amounts of black smoke.

In its narrow aspects, therefore, the invention comprehends conducting the submerged combustion with a sufficient amount of the present fuel to maintain the bath in a molten condition and at a desired fluidity, and with about 50 to 98% of the air required for complete combustion of the fuel. Preferably, the process is conducted so as to maintain the molten pool at about 2,200–2,500 degrees F., with about 57 to 75%, and especially about 70% of the air required for the combustion of the fuel. It will be understood that as used herein, any oxygen-containing gas may be used as an equivalent of air. For example, oxygen enriched air or a gas having an oxygen content lower than that of air may be used.

While it is not desired to be bound by any particular theory to account for the results of the invention, it may be that in addition to supplying heat to maintain the molten pool at a desired temperature, the character of the present fuel is such that it is readily and rapidly cracking in the presence of the molten bath down to nascent carbon which is in an extremely finely divided condition. Such nascent carbon at the molten temperature of the bath reduces the oxidic zinc in the molten material to a metallic zinc in a solid to solid reaction. Metallic zinc, being volatile at the molten temperatures of the bath, is then evolved therefrom as metallic zinc vapor. The solid to solid reaction and the evolution of metallic zinc from the bath may be enhanced due to the violent agitation produced by the gaseous products of combustion produced in and released from the molten bath. As the amount of air is decreased below about 65% of that required for complete combustion it may become increasingly more difficult to supply sufficient heat to the bath to maintain it in a completely molten condition, and at the same time supply endothermic heat for the cracking reaction. Thus, as the air is decreased below about 50%, the reduction and evolution of zinc may decrease until these reactions stop completely.

The invention will be further illustrated in the accompanying drawings and examples. It should be understood, however, that the drawings and examples are given for purposes of illustration and that the invention in its broader aspects is not limited thereto.

In the drawings:

Fig. 2 is a top view of the apparatus of Fig. 1.

Fig. 3 is a curve in which percentage of zinc eliminated from the zinciferous material is plotted against amount of air used in terms of percentage of that required for complete combustion of the fuel.

Figure 1:
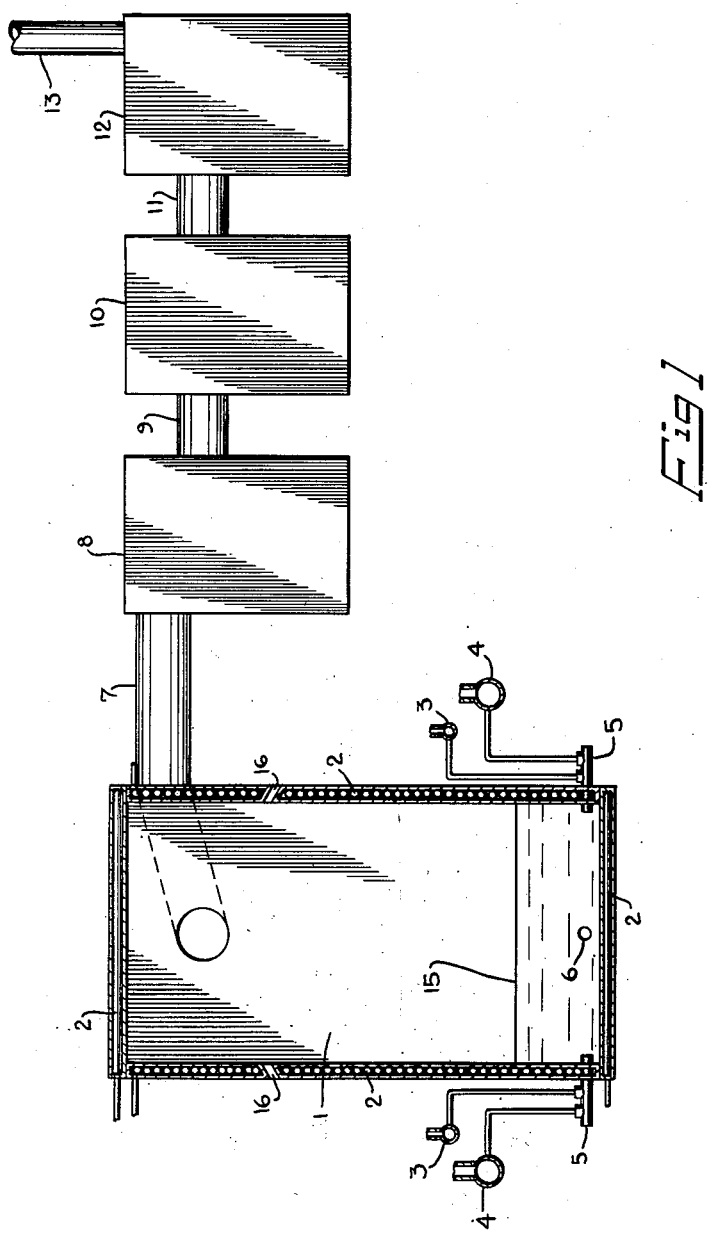
Fig. 1 is an end view taken along line 1—1 of Fig. 2 illustrating the preferred apparatus for conducting the process.

Referring now to Figs. 1 and 2, the numeral 1 represents a zinc fuming furnace having water-jacketed top, bottom, side and end walls, the water tubes of the jackets being illustrated by numeral 2. The furnace is also provided with fuel bustle pipe 3, air bustle pipe 4, tuyeres 5 and tap hole 6. Connected to the furnace is conduit 7 for withdrawing therefrom products of combustion mixed with zinc fume. The hot gases are led through conduit 7 through waste heat boiler 8 where the gases are partially cooled and in which the removed heat is converted to steam. The partially cooled gases are then led through conduit 9 to cooler 10 where they are reduced to a sufficiently low temperature so as to permit them to be filtered in bag-type filters. From cooler 10 the gases are passed through conduit 11 into baghouse 12 where the gases are filtered to recover their zinc fume content, after which the filtered gases are exhausted to the atmosphere through outlet 13.

In operation, zinc-bearing material, preferably in a molten state, is introduced into the furnace through charging opening 14, until it reaches any desired level 15 which preferably is about three feet in depth. In order to prevent filling and plugging of tuyeres 5 during the charging, the air and fuel mixture is injected at operating pressure into the furnace and burned therein. Also during the charging, sufficient air is used to completely burn the fuel, although incomplete combustion may be practiced if desired. After the furnace has been charged, the fuel and air mixture is adjusted to provide the desired degree of incomplete combustion. Such submerged combustion preferably is continued until the zinc content of the charge has been lowered to about 2% or less, calculated as zinc. The time required for the removal of zinc will depend upon a number of factors, including firing rate per ton of charge, temperature of the molten bath, and zinc content of the charge. Thus, for example, using a residual type oil having an A. P. I. gravity of 7–9 degrees at a rate of about .18 to .35 gallon of oil per minute per ton of charge containing about 15% zinc maintained at about 2300° F., the zinc content of the charge is reduced to about 2% in about two hours, or less. The residual charge is withdrawn through tap hole 6 and may be discarded or, if desired, further treated to recover metal values therein.

During the incomplete combustion the reduced metallic zinc is vaporized from the bath. The thus evolved zinc vapor may be brought into contact above the bath with secondary air introduced through ports 16 and the zinc converted to a fine zinc oxide fume which remains suspended in the gas until removed in the bag filters. The zinc oxide fume collected in the baghouse 12 will contain any lead that may have been present in, and which was reduced and vaporized from the charge. The lead in the baghouse fume will also be present in the form of an oxide. Such fume may be further processed to separate the lead from the zinc. The deleaded zinc oxide fume may be sold as such, or may be further processed to convert it to metallic zinc.

In operating the process, it has been found advantageous to introduce air at a constant velocity which is sufficient to prevent backwash of the molten charge into the tuyere. The rate of injection of the fuel is then varied as required to provide the desired degree of combustion of the fuel. The tuyeres may be placed so as to provide any desired degree of submersion. For best results, however, they are placed, as shown, in a position adjacent to the furnace bottom, and as close thereto as permissible without burning through the bottom jacket.

The process is further illustrated in the following examples:

EXAMPLE I

A series of tests were made using apparatus and procedure as described in connection with Figs. 1 and 2. The furnace was provided with 12 standard metallurgical tuyeres arranged in two banks of six tuyeres on opposite sides of the furnace. The series of charges were introduced in a molten condition and filled the furnace to a depth of about three feet, the height of the furnace wall being 20 feet, and the inlet ports 16 being located 13 feet from the furnace bottom. During each test, air at a constant rate was introduced through each of the tuyeres, the total rate for the twelve tuyeres amounting to 4,000 cu. ft. per minute. The rate of introduction of fuel was varied to give the desired degree of partial combustion. The fuel used was a residue type oil from thermally cracked petroleum and had an A. P. I. gravity value of 7–9 degrees. It had a heating value of 19,800 B. t. u.'s per pound. The charge in each test was molten lead blast furnace slag. The data obtained are set forth in Table 1:

Table 1

| Test Number | 1 | 2 | 3 | 4 | 5 | 6 | 7 | 8 | 9 |
|---|---|---|---|---|---|---|---|---|---|
| Oil Used G. P. M | 2.6 | 3.2 | 3.4 | 3.6 | 3.8 | 4.0 | 4.4 | 4.6 | 5.0 |
| Gal. Oil/Ton Slag | 22.0 | 27.0 | 28.7 | 30.4 | 32.1 | 33.8 | 37.2 | 38.8 | 42.2 |
| Air, percent of that required for complete combustion | 98.0 | 79.0 | 76.0 | 71.0 | 68.0 | 64.0 | 58.0 | 56.0 | 51.0 |
| Time, Minutes | 120 | 120 | 120 | 120 | 120 | 120 | 120 | 120 | 120 |
| Temperature, °F | 2,300 | 2,300 | 2,300 | 2,300 | 2,300 | 2,300 | 2,300 | 2,300 | 2,300 |
| Air, C. F. M | 4,000 | 4,000 | 4,000 | 4,000 | 4,000 | 4,000 | 4,000 | 4,000 | 4,000 |
| Tons of Charge per batch | 14.2 | 14.2 | 14.2 | 14.2 | 14.2 | 14.2 | 14.2 | 14.2 | 14.2 |
| Percent Zn in Initial Charge | 15.7 | 15.7 | 15.9 | 15.9 | 15.8 | 16.1 | 15.8 | 15.8 | 15.8 |
| Percent Zn in Residual Charge | 4.4 | 2.71 | 2.29 | 2.32 | 1.82 | 1.77 | 2.02 | 3.5 | 4.15 |
| Pounds Zn/Gal. Oil | 10.5 | 10.0 | 9.7 | 9.2 | 8.9 | 8.5 | 7.6 | 6.7 | 5.9 |
| Percent Zinc Eliminated | 74.2 | 84.2 | 88.7 | 88.6 | 91.1 | 91.4 | 89.5 | 82.8 | 78.7 |

The results obtained are illustrated in Fig. 3 in which there is plotted percentage of zinc eliminated from the charge vs. amount of air used in terms of percentage of that required for complete combustion (as distinguished from theoretical air required for complete combustion).

It has been found that it is not economically feasible to operate a process of the type with which the present invention is concerned, with removal of less than 70% of the zinc in the charge. It will be seen from Fig. 3 that to obtain such percentage removal it is necessary that the fuel be burned with air in amounts of about 98 to 50% of the air required to completely burn the fuel. Highest percentages of zinc removal are obtained with percentage of air in the range of about 75 to 57% with the highest zinc removal being obtained with percentage of air of about 65%. For economic reasons, in terms of fuel consumption per pound of eliminated zinc, the optimum air percentage is about 70%.

EXAMPLE II

The tests set forth in Example I were repeated, but in this case a residue type of oil from catalytically cracked petroleum was used which had A. P. I. gravity value of 10 degrees. It had a heating value of 18,344 B. t. u.'s per pound. This oil was a blend of a tar residue from a catalytically cracked petroleum, and 26% of a distillate from a catalytically cracked petroleum. The distillate had an A. P. I. gravity value of 28 degrees and that of the tar residue was 5.8 degrees. The same results as illustrated in Fig. 3 were obtained. A somewhat higher amount of oil, in terms of gallons per minute per ton of charge was required than in Example I, due to the lower density of the blended fuel.

EXAMPLE III

The procedure set forth in Example I was again repeated but in this example a catlytically cracked petroleum distillate fuel, rather than a residual type of fuel, was used and had A. P. I. gravity value of 32 degrees. It had a heating value of 19,789 B. t. u.'s per pound. Regardless of the degree of incomplete combustion, or the oil injection rate, it was not possible to obtain zinc removal from the charge in the amounts in excess of about 50%.

EXAMPLE IV

The procedure set forth in Example I was repeated using natural gas in amounts equivalent in heating value to that of the fuel in the various tests of Example I. Regardless of the degree of incompleteness of the combustion, it was not possible to obtain zinc removal from the charge in amounts in excess of about 25%.

EXAMPLE V

Test No. 4 of Example I was repeated and the same results were obtained. The same procedure was repeated using powdered coal as fuel, in amounts sufficient to obtain the same percentage of zinc removal from the charge. 418 pounds of coal per ton of slag treated, were used. The coal had a heating value of 14,500 B. t. u.'s per pound. The total B. t. u. value per ton of slag treated with the fuel of Test No. 4 of Example I was 4,010,000. The total B. t. u. value per ton of slag treated with the powdered coal was 6,601,000. The total heat required for the same percentage zinc removal from the charge (88.6%) was 39.2% less for the liquid residual type of fuel than that required in the case of powdered coal.

What is claimed is:

1. A process for removing more than a major proportion of the reducible zinc values from a metallurgical slag containing about 8–19% of such values calculated as ZnO without the use of powdered coal which comprises establishing a molten pool of said material, injecting into the molten pool adjacent the bottom thereof a combustible mixture of a liquid fuel and air in amounts to insure incomplete combustion of said fuel but in amounts greater than the minimum amount of air required to inject said fuel into the pool, said fuel having an A. P. I. gravity not in excess of about 12 degrees and comprising a residual oil from the cracking of petroleum, controlling the rate of addition of said fuel and the rate of its combustion to maintain the pool in a molten condition and at temperatures below 2500° F., whereby the reducing conditions established in said molten pool are at least equivalent to those obtainable by substituting powdered coal for said oil in the aforesaid steps and which conditions are capable of reducing more than a major proportion of the zinc values in said material to metallic zinc and the thus reduced zinc is volatized from the molten pool, and continuing the injection of said combustible mixture until more than a major proportion of said zinc values have been removed from said pool.

2. A process according to claim 1 in which said slag is a lead blast furnace slag, said fuel has an A. P. I. gravity in the range of about 7–12 degrees, the injection of said combustible mixture into said molten pool is continued for a period of time not in excess of about two hours, and the temperature of said pool is maintained in the range 2200° F. to 2500° F.

3. A process according to claim 2 in which said fuel is a mixture of a residual oil having an A. P. I. gravity of about 5–7 degrees and a lighter distillate oil having an A. P. I. gravity above about 20–23 degrees.

References Cited in the file of this patent

UNITED STATES PATENTS

| 1,774,333 | Laist | Aug. 26, 1930 |
| 1,893,798 | Fowler et al. | Jan. 10, 1933 |
| 1,936,092 | Kuzell | Nov. 21, 1933 |